United States Patent [19]

Ludden

[11] Patent Number: 4,791,284

[45] Date of Patent: Dec. 13, 1988

[54] METHOD FOR ETCHING A BAR CODE ON METAL

[76] Inventor: Richard Ludden, 6030 Adams St., Lincoln, Nebr. 68507

[21] Appl. No.: 114,066

[22] Filed: Oct. 29, 1987

[51] Int. Cl.[4] .......................................... G06K 19/02
[52] U.S. Cl. ..................................... 235/487; 235/488
[58] Field of Search ................................ 235/487, 488

[56] References Cited

U.S. PATENT DOCUMENTS 4,085,314  4/1978  Schultz ................................ 235/488
4,327,283  4/1982  Heyman et al. .
4,446,362  5/1984  Heyman .

OTHER PUBLICATIONS

Marking Methods, Inc. Publication, "What is Electrochemical Etching", (1986) pp. 1–4 and 12.
Instruction Sheet entitled "I.N.T./Image 'n Transfer", (un-dated) 1 page.
Publication of GC Electronics, "P.T.S. Positive Transfer System Printed Circuit Board Making System", (un-dated) 2 pages.
Advertisement of Monode Marking Products, Inc., (un-dated) three pages.
Advertisement of Lectroetch Company, (un-dated), three pages.
Lectroetch Company Publication, "Electrochemical Marking Manual", (1971) pp. 1–21.

*Primary Examiner*—Harold I. Pitts
*Attorney, Agent, or Firm*—Spencer & Frank

[57] ABSTRACT

To etch a bar code on a metal surface, a sheet of transfer material having an adhesive layer of negative-acting photosensitive substance is exposed through a positive of the desired bar code. After development, the adhesive layer provides an etching mask having apertures which correspond in position and shape to the bars of the positive. The mask is sealingly affixed to the metal surface. The metal is then electrochemically etched through the apertures in the mask to provide tough, black bars which remain after the mask is removed. Since the mask adheres to the metal surface, etchant seepage at the edges of the apertures does not occur, which improves the readability of the bar code etched onto the surface.

16 Claims, 3 Drawing Sheets

METHOD FOR ETCHING A BAR CODE ON METAL

BACKGROUND OF THE INVENTION

The present invention relates to a method for etching a bar code on a metal surface, such as the surface of a tool. The invention also relates to a sheet having a plurality of adhesive etching masks that can be cut from the sheet and used to practice the method, with the different masks of the sheet providing bar codes which encode different information such as consecutive serial numbers to be etched onto tools.

A bar code is an array of bars which are marked parallel to one another on a surface and which have various thicknesses to encode information such as characters and/or numbers. The encoded information can be optically read, or converted into electrical signals for use by a computer or other circuitry, using a hand-held wand or a counter-installed scanner. The Universal Product Code is a bar code that is familiar to most people in the United States because it has been adopted as a standard by the food industry, and is frequently printed on labels for cans or boxes of prepackaged food. In one version of this code, ten digits can be encoded to identify such features as the manufacturer, brand, and size. Specifications for the Universal Product Code establish the number and thickness of the bars needed to encode these ten digits, together with other information such as stop and start codes and a check digit. Despite the ubiquity of the Universal Product Code in the grocery field, however, specifications have been published to provide formats for other bar codes. For example Code 39, which has been adopted by the United States Department of Defense and which is being increasingly used by industry, employees 18 bars to encode 6 digits and ancillary information.

The digits permitted by a particular bar code format might be encoded using pen and ink by a draftsman who pays close attention to the code specifications. However it is far more frequent to use a bar code printer. Bar code printers are available which employ keyboards for manual input of the data to be encoded. One such bar code printer is the C. Itoh model CI-800, which is available from CIE Terminals, Inc., 2505 McCabe Way, Irvine, Calif. 92714. Furthermore commercially-available programs for printing bar codes can be run on personal computer systems having dot-matrix printers.

Since the general utility of bar codes for encoding information is widely recognized, it is not surprising that attempts have been made to mark bar codes on metal surfaces. Such attempts have met with only limited success in practice. Marking a bar code on a metal surface using laser etching or mechanical abrasion requires expensive equipment, and moreover poor read-rates sometime result. A bar code printed on a sticker and adhesively attached to a metal surface is easily damaged even if a tough material is used for the sticker. Furthermore the label may become detached due to degeneration of the adhesive if the surface is exposed to high temperatures or harsh chemicals. A bar code might be painted on a metal surface through a suitable stencil which is pressed against the surface, but paint seepage between the metal surface and the stencil at the edges of bars would result in poor read-rates. Furthermore the paint might chip, further reducing readability, if the surface is subjected to rough treatment. One might attempt to reduce the chipping problem, when a stencil bearing a bar code is pressed against a metal surface, by marking the surface using electrochemical etching rather than paint, but bars with poorly defined edges and hence poor readability would still result.

Electrochemical etching is a technique that is widely used to mark numbers or letters on a metal surface. Both ferrous metals, including stainless steel, and non-ferrous metals such as aluminum, brass, and copper, can be marked using electrochemical etching, as can plated layers of chrome, nickel, etc. Using the conventional electrochemical etching technique, one first prepares a stencil bearing the desired numbers or letters. Except at regions within the outlines of the desired numbers or letters, the stencil is impervious to fluid. After the metal surface to be marked is thoroughly cleaned, a pad which is soaked in an electrolyte is used to press the stencil against the surface. One output terminal of a power supply is then connected to the metal, and the other terminal is connected to a conductive plate within the pad. If the power supply delivers alternating current, during one portion of the waveform metal is etched away from the surface, where the surface is exposed to electrolyte through the stencil, and during the other portion of the AC waveform the metal is re-deposited as an oxide. The resulting metal oxide deposit is tough, and is easily distinguished visibly from adjacent portions of the metal surface which have been protected from the electrochemical etching by the impervious regions of the stencil. Direct current may be used instead of alternating current, in which case metal is etched away from the surface but not redeposited as an oxide. Morover the AC and DC techniques can be combined, so that the AC technique is used to deposit a metal oxide coating at the bottom of a recess which was produced using DC etching. The etching current is not critical, and typically ranges from one amper to thirty ampers. Electrochemical etching equipment, including stencil materials, power supplies, and suitable electrolytes for use with a wide range of metals, are commercially available. One such commercial source is Monode Marking Products, Inc., 23620 St. Clair Avenue, Cleveland, Ohio 44117.

SUMMARY OF THE INVENTION

An object of the invention is to provide a method for applying a durable and highly-readable bar code to a metal surface.

Another object of the invention is to provide a method for using electrochemical etching to apply a bar code to a metal surface, with an adhesive mask being used in lieu of a press-on stencil in order to prevent seepage of etchant at the edges of the bars.

Another object of the invention is to provide a method for applying a bar code to a metal surface using electrochemical etching through an adhesive mask which is produced using a sheet of transfer material having a negative-acting layer of photosensitive substance, with the mask itself being the only negative that is required.

Another object of the invention is to provide a sheet having a plurality of adhesive bar code masks which can be cut out and used separately to etch bar codes onto different metal surfaces, each mask encoding different information such as different serial numbers and being positioned on the sheet in accordance with the encoded information.

These and other objects which will become apparent in the ensuing detailed description can be attained by providing a method wherein a positive of the bar code is prepared, a sheet of transfer material having an adhesive layer of photosensitive substance is exposed through the positive, the sheet is developed to make an adhesive negative having apertures which correspond to the bars of the bar code on the positive, the adhesive negative is pressed against the metal surface, the metal surface is electrochemically etched through the apertures, and then the adhesive layer is removed, leaving the bar code.

DESCRIPTION OF THE PREFERRED EMBODIMENTS

Figure 1:
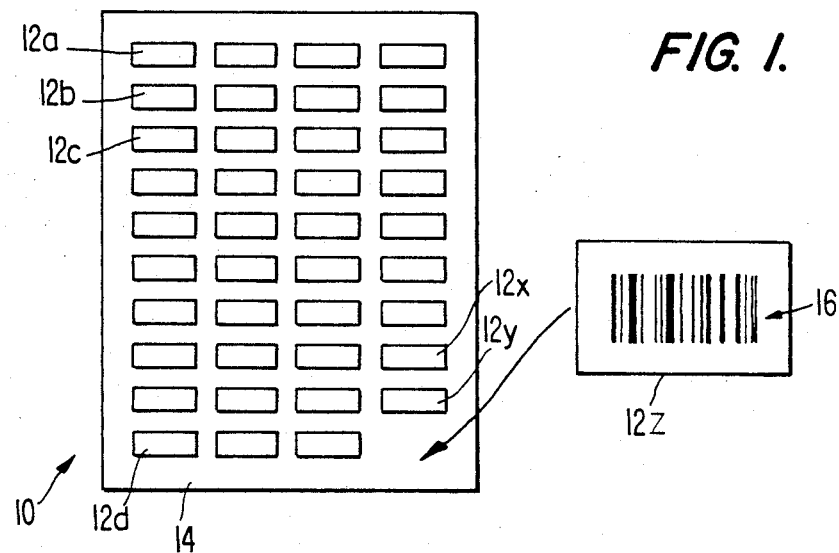
FIG. 1 is a plan view illustrating a master positive formed by 40 strips of paper bearing bar codes glued to a larger sheet of paper, each of the bar codes encoding different information.

In FIG. 1 a master positive 10 is formed by pasting 40 paper strips 12a, 12b, 12c, . . . , 12d, . . . , 12x, 12y, 12z in a 4×10 array on a paper support sheet 14. Printed on each of strips 12a . . . 12z is a bar code 16, although the bar code is only illustrated for sheet 12z. The bar codes 16 encode different information such as consecutive serial numbers. For example the bar code 16 on strip 12a might encode the serial number "000 001", the bar code 16 printed on strip 16b might encode the serial number "000 002", and so on up to the bar code 16 on strip 12z, which would encode the serial number "000 040."

The bar codes 16 may be printed on strips 12a . . . 12z using a conventional bar code printer. Although not illustrated, after the bar codes are printed additional indicia such as a trademark and the decimal equivalents of the encoded serial numbers can also be printed on the strips 12a . . . 12z.

Figure 2:
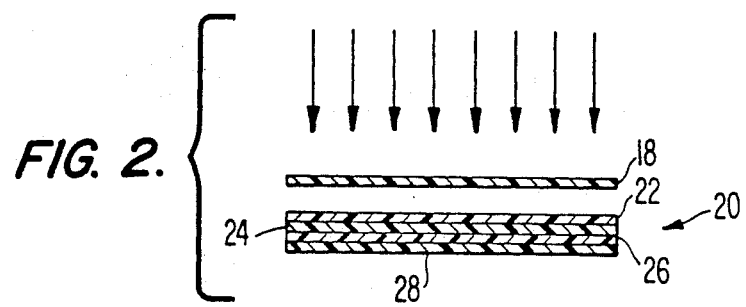
FIG. 2 is a sectional view illustrating a sheet of transfer material and a positive transparency made from the master positive of FIG. 1, the transfer material having an adhesive layer of negatively-acting photosensitive substance which is exposed through the transparency.

Master positive 10 is used to make a secondary positive 18, shown in FIG. 2. This can be done by copying master positive 10 onto a transparent plastic sheet using a conventional office copier (not illustrated). As a result the 40 bar codes 16 are depicted on the secondary positive 18, and the quality of the bar codes 16 on secondary positive 18 may be checked if desired using a wand reader (not illustrated).

Reference number 20 designates a sheet of transfer material. Sheet 20 includes a transparent carrier 22, an adhesive layer 24 made from negative-acting photosensitive substance, an opaque coating 26, and a protective film 28. Transfer material 20 is commercially available from Esselte Pendaflex Corporation, 71 Clinton Road, Garden City, N.Y. 11530 under the trademark "LETRASET I.N.T." or "IMAGE AND TRANSFER." The material is frequently used in drafting and graphic arts departments for making artwork.

With continuing reference to FIG. 2, secondary positive 18 is placed in contact with carrier 22 of transfer material 20. Layer 24 is then exposed through positive 18 to ultraviolet light, illustrated schematically by the arrows in the Figure. The exposure may be made for 2.5 minutes using a 275 watt ultraviolet light spaced 12 inches from secondary positive 18. After the exposure, protective film 28 is stripped away from sheet 20, and then opaque coating 26 is washed away with water. Layer 24 is then developed to remove portions thereof that have been shielded from the ultraviolet light by the bars of bar code 16.

Figure 3:
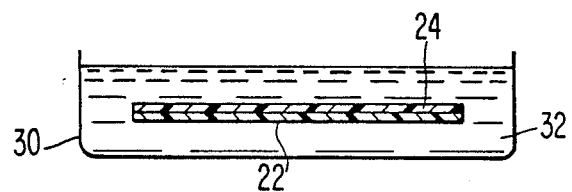
FIG. 3 is a sectional view schematically illustrating the photosensitive layer and a carrier in a tray of developer.
Figure 4:
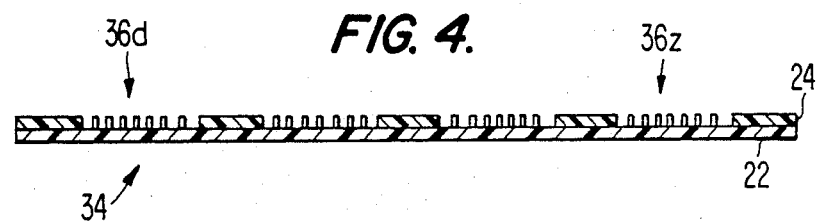
FIG. 4 is a sectional view schematically illustrating adhesive bar code masks on the carrier after development has been completed.

FIG. 3 illustrates the development step. Carrier 22 and layer 24 are placed in a tray 30 of "I.N.T." developer, which is commercially available from Esselte Pendaflex Corporation at the address given above. After standing in developer 32 for about 30 seconds, layer 24 is lightly rubbed with a cotton pad (not illustrated). After a few seconds the portions of layer 24 which have been protected from the ultraviolet light begin to come off. The rubbing and development continue until n further material can be removed from carrier 22. Carrier 22 and the remaining portions of layer 24 are then washed in water and dryed for at least an hour. The result is a sheet 34 of adhesive bar code masks as illustrated in FIG. 4. Sheet 34 is tacky, and unless it is to be used immediately for etching bar codes, as will be described below, should be protected by placing a protective film (not illustrated) on layer 24. Thus protected, sheet 34 has a shelf life of at least several weeks. Preferably, sheet 34 is used within six months.

With reference next to both FIGS. 1 and 4, it will be apparent that sheet 34 includes 40 bar code masks 3b (of which oly masks 36d and 36z are individually identified, disposed in 4 columns of 10. Bar code mask 36d, for example, represents a negative of the bar code 16 on strip 12d, while bar code mask 36z represents a negative of the bar code 16 on strip 12z. That is, mask 36z has slots or apertures in layer 24 which correspond in position and dimensions to the black bars of the bar code 16 printed on strip 12z.

The use of an adhesive bar code mask 36 to electrochemically etch a bar code on a metal surface will now be described.

Bar code mask 36z, for example, is cut from sheet 34, and any protective film (not illustrated) that had previously been applied to layer 24 is removed. The metal surface which is to receive the bar code is then thoroughly cleaned to remove any rust, corrosion, dust, or other contaminants. Any oil or grease must also be removed, and 91 percent pure medical alchohol is suitable for this purpose.

Figure 5:
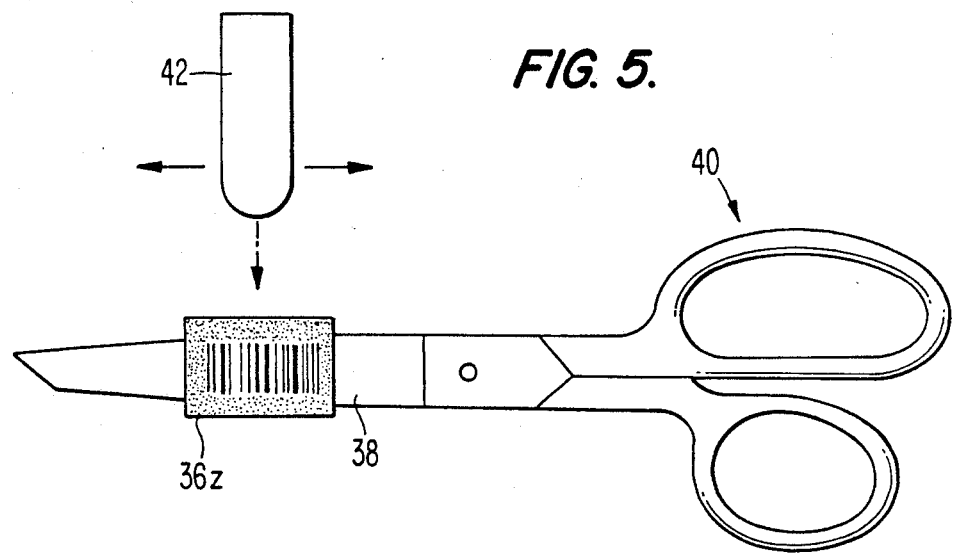
FIG. 5 schematically illustrates a pair of scissors and a burnishing tool which is used to affix a bar code mask cut from the sheet of FIG. 4.
Figure 6:
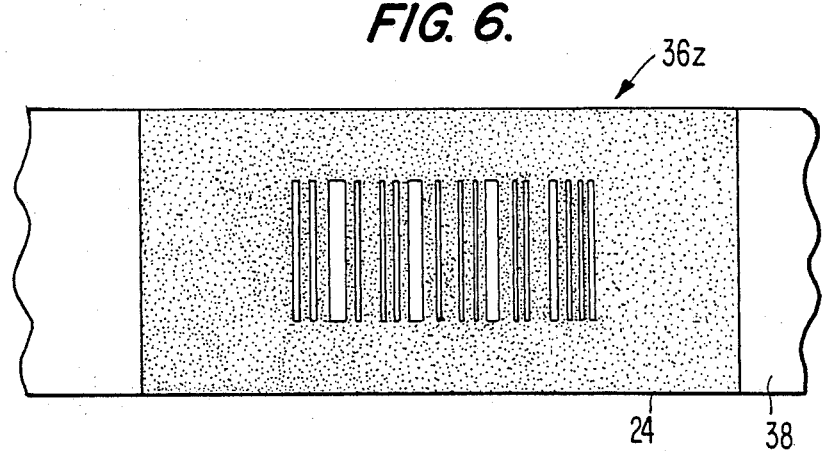
FIG. 6 is a top plan view, partially broken away, illustrating the mask adhesively affixed to a scissor blade.

In FIG. 5 the metal surface which is to receive the bar code is blade 38 of scissors 40. The mask 36z is placed on the prepared metal surface, with layer 24 contacting the metal surface. A burnishing tool 42 is then rubbed against the carrier 22 (see FIG. 4) of the mask 36z to press the adhesive layer 24 against blade 38. Carrier 22 is then peeled away, leaving the mask pattern provided by layer 24 affixed to the metal. This is illustrated in FIG. 6, which illustrates that the metal is exposed through apertures corresponding to the black bars of the bar code 16 printed on strip 12z (FIG. 1). Except at these apertures, blade 38 is sealingly coated with adhesive layer 24. It will be apparent that mask 36z is itself a negative of the original bar code 16. Electrochemical etching is a negative process, in the sense that unprotected areas become darkened by metal oxide. The result is that a negative image of the negative provided by mask 36z is deposited on blade 38, and this deposited negative image is the same as the original bar code 16 on strip 12z. No intervening negatives are needed despite the fact that transfer material 20 is traditionally exposed through a negative when it is used by graphic artists.

Figure 7:
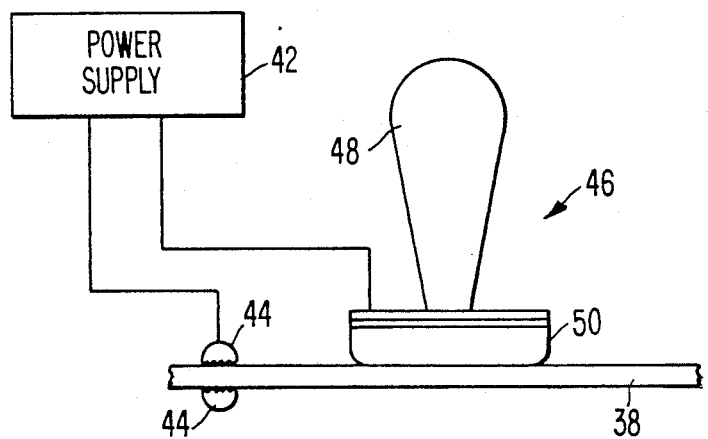
FIG. 7 schematically illustrates a side view of the scissor blade to which the mask is affixed, and equipment for electrochemical etching of the blade through the mask.

FIG. 7 illustrates the electrochemical etching step through the mask 36z that has been attached to blade 38. One terminal of a power supply 42 is electrically connected to blade 38 by way of an alligator clip having a pair of hinged jaws 44. The other terminal of power supply 42 is electrically connected to a metal plate (not illustrated) within an electrolyte applicator 46, which includes a handle 48 extending from a pad 50 saturated with a commercially available electrolyte suitable for the metal that is being etched. If blade 38 is stainless steel, for example, "MSC 120" electrolyte, commerically available from Monode Marking Products, Inc., having an office at the aforesaid address, may be used. Applicator 46 is pressed toward blade 38 as power is provided from supply 42. To recess the bar code 15 into the surface of blade 38, DC is first used to etch away unprotected metal. After the desired depth has been attained, AC is used to alternately etch metal and redeposit metal oxide. The DC etching depth is not critical and, in fact, DC etching need not be used at all. If DC etching is employed, neither the DC etching time nor the DC etching current is critical. A typical DC etching time would be fifteen seconds, at a current of fifteen amps. AC etching should be conducted long enough to provide a dense, opaque coating of metal oxide on the exposed metal. The AC etching time and current are not critical, but a typical AC etching time would be 5 to 10 seconds and a typical AC etching current would be 10 amps. These times and currents can be varied within wide ranges. In general, the etching time is reduced as the etching current is increased. The fact that mask 36z adheres to blade 38 permits the etching process to be interrupted for a visual check on how it is progressing. After the check, applicator 46 can be re-applied to blade 38 without fear that etching will resume at a displaced position.

Figure 8:
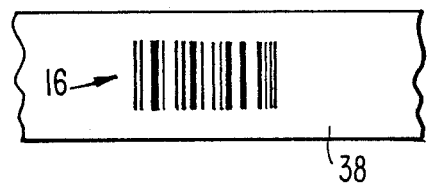
FIG. 8 is a plan view, partially broken away, of the bar code etched on the scissor blade.

After the electrochemical etching step has been completed, blade 38 is wiped with a pad (not illustrated) soaked in a solvent such as acetone to remove the layer 24. The metal oxide remains firmly attached, in the pattern of bar code 16 as illustrated in FIG. 8.

It will be apparent that the foregoing procedure may be modified in various ways. In particular, one need not start with a master positive 10 (see FIG. 1) of paper, and then proceed to a secondary positive 18 (see FIG. 2) using a office copier (other photographic or xerographic process). Instead, bar codes 16 may be printed from the start on transparent or translucent substrates, which are then affixed to a transparent or translucent support. It goes without saying that it is unnecessary to make an entire sheet 34 (see FIG. 4) of bar code masks unless they are all needed, and that the sheet 34 need not provide bar code masks which encode consecutive serial numbers. However since a major application of the present invention is to apply serial numbers to tools, such sheets of masks have the advantage of facilitating record keeping.

What I claim is:

1. A method for etching a bar code having a plurality of dark bars on a metal surface, comprising the steps of:
   (a) preparing a positive of the bar code, the positive including a light-permeable support and dark bars depicted on the support, the dark bars depicted on the support corresponding to the dark bars to be etched on the metal surface;
   (b) exposing a sheet of transfer material to light through the positive, the transfer material including a light-permeable carrier and an adhesive layer of photosensitive substance on the carrier;
   (c) making an adhesive negative of the bar code by developing the sheet of transfer material to provide apertures in the adhesive layer, the apertures in the adhesive layer corresponding to the dark bars of the positive;
   (d) pressing the negative against the metal surface to transfer the adhesive layer to the metal surface;
   (e) removing the carrier from the adhesive layer;
   (f) etching the metal surface through the apertures in the adhesive layer; and
   (g) removing the adhesive layer.

2. The method of claim 1, wherein step (a) comprises printing the bar code on a piece of paper, and xerographically copying the printed bar code onto the light-permeable carrier.

3. The method of claim 1, wherein step (a) comprises depicting a plurality of bar codes at spaced-apart positions on a sheet of paper, the bar codes depicted on the sheet of paper encoding different information, xerographically copying the bar code depicted on the sheet of paper onto the light-permeable support, selecting one of bar codes that was xerographically copied onto the light-permeable support, and cutting the support to remove the selected bar code.

4. The method of claim 3, wherein the step of depicting a plurality of bar codes at spaced-apart positions on a sheet of paper comprises printing the bar codes on strips of paper, and attaching the strips to the sheet of paper at spaced-apart positions.

5. The method of claim 3, wherein the bar codes depicted on the sheet of paper encode a sequence of different serial numbers, and wherein the step of depicting a plurality of bar codes at spaced-apart positions on a sheet of paper is conducted by arranging the bar codes on the sheet of paper in numerical order in accordance with the serial numbers they encode.

6. The method of claim 1, wherein step (f) is conducted by electrochemically etching the metal surface through the apertures in the adhesive layer.

7. The method of claim 6, wherein the step of electrochemically etching comprises wetting a pad with an electrolyte, pressing the pad against the adhesive layer that was transferred to the metal surface, and establishing an electrical current between the pad and the metal surface through the apertures in the adhesive layer.

8. The method of claim 7, wherein the step of establishing an electrical current comprises establishing an AC current to produce a dark metal compound at the regions of the metal surface exposed to the apertures in the adhesive layer.

9. The method of claim 7, wherein the step of establishing a electrical current comprises establishing a DC current to recess the regions of the metal surface exposed to the apertures in the adhesive layer.

10. The method of claim 8, wherein the step of establishing an electrical current further comprises establishing an AC current to produce a dark metal compound inthe recessed regions.

11. A metal object having a surface with a bar code etched in accordance with the method of claim 1.

12. An adhesive negative for etching a bar code on a metal surface in accordance with the method of claim 1.

13. A sheet of bar code masks for etching bar codes, each having a plurality of dark bars, on metal surfaces, comprising:

a carrier sheet; and an adhesive layer on the carrier sheet, the adhesive layer having a plurality of apertured regions, each apertured region corresponding to a respective bar code and having openings which correspond in size and position to the dark bars of the respective bar code.

14. The sheet of claim 13, wherein the bar codes encode a sequence of serial numbers, and wherein the apertured regions are arranged on the carrier sheet in accordance with the serial numbers encoded by the respective bar codes.

15. The sheet of claim 14, wherein the apertured regions are disposed in rows and columns.

16. The sheet of claim 13, wherein the apertured regions are disposed in rows and columns.

* * * * *